United States Patent
Tremblay et al.

(10) Patent No.: US 8,127,050 B1
(45) Date of Patent: Feb. 28, 2012

(54) INPUT/OUTPUT PIN ALLOCATION FOR DATA STREAMS OF VARIABLE WIDTHS

(75) Inventors: Yves Tremblay, Pointe-Claire (CA); Pierluc Bertrand, Laval (CA)

(73) Assignee: Matrox Graphics Inc., Montreal (CA)

( * ) Notice: Subject to any disclaimer, the term of this patent is extended or adjusted under 35 U.S.C. 154(b) by 0 days.

(21) Appl. No.: 12/815,660

(22) Filed: Jun. 15, 2010

Related U.S. Application Data

(62) Division of application No. 12/047,067, filed on Mar. 12, 2008.

(51) Int. Cl.
*G06F 3/00* (2006.01)
*G06F 3/12* (2006.01)

(52) U.S. Cl. ........................................... 710/12; 710/62

(58) Field of Classification Search .................. 370/230, 370/464–465, 535, 537, 539, 540
See application file for complete search history.

(56) References Cited

U.S. PATENT DOCUMENTS

| | | | |
|---|---|---|---|
| 6,900,665 B2 * | 5/2005 | Ma .................................. | 326/94 |
| 7,143,360 B1 * | 11/2006 | Ogami et al. ................. | 715/763 |
| 7,346,082 B2 * | 3/2008 | Ghiasi et al. .................. | 370/539 |

* cited by examiner

*Primary Examiner* — Tariq Hafiz
*Assistant Examiner* — Dayton Lewis-Taylor
(74) *Attorney, Agent, or Firm* — Norton Rose Canada LLP

(57) ABSTRACT

There is described a method and system for inputting/outputting multiple data streams of variable widths. Input/output pins are grouped together via a plurality of transfer blocks, each transfer block being controlled by an independent clock. Data streams can therefore be input/output using asynchronous clocks. Two data streams can also be input/output on a single pin using the rising and falling edge of the clock.

11 Claims, 15 Drawing Sheets

| Location in formatted stream | Bit |
|---|---|
| 0 | s1(0) |
| 1 | s2(0) |
| 2 | s1(1) |
| 3 | s2(1) |
| 4 | s1(2) |
| 5 | s2(2) |
| 6 | s1(3) |
| 7 | s2(3) |
| 8 | s1(4) |
| 9 | s2(4) |
| 10 | s1(5) |
| 11 | s2(5) |
| 12 | s1(6) |
| 13 | s2(6) |
| 14 | s1(7) |
| 15 | s2(7) |

FIGURE 7A

| Location in positioned vector | Formatted stream bits | Associated transfer block | Transfer block input pin | Output port pin |
|---|---|---|---|---|
| 8 | s1(0) | 126 | 0 | 4 |
| 9 | s2(0) | 126 | 1 | 4 |
| 10 | s1(1) | 126 | 2 | 5 |
| 11 | s2(1) | 126 | 3 | 5 |
| 12 | s1(2) | 126 | 4 | 6 |
| 13 | s2(2) | 126 | 5 | 6 |
| 14 | s1(3) | 126 | 6 | 7 |
| 15 | s2(3) | 126 | 7 | 7 |
| 16 | s1(4) | 128 | 0 | 8 |
| 17 | s2(4) | 128 | 1 | 8 |
| 18 | s1(5) | 128 | 2 | 9 |
| 19 | s2(5) | 128 | 3 | 9 |
| 20 | s1(6) | 128 | 4 | 10 |
| 21 | s2(6) | 128 | 5 | 10 |
| 22 | s1(7) | 128 | 6 | 11 |
| 23 | s2(7) | 128 | 7 | 11 |

FIGURE 7B

| Output port pins | clock cycle | |
|---|---|---|
| | Rising edge | Falling edge |
| 4 | s1(0) | s2(0) |
| 5 | s1(1) | s2(1) |
| 6 | s1(2) | s2(2) |
| 7 | s1(3) | s2(3) |
| 8 | s1(4) | s2(4) |
| 9 | s1(5) | s2(5) |
| 10 | s1(6) | s2(6) |
| 11 | s1(7) | s2(7) |

FIGURE 8

| Output format | Output rate | Output mode | Formatted stream | | | | | | | | | | | | | | | |
|---|---|---|---|---|---|---|---|---|---|---|---|---|---|---|---|---|---|---|
| 8 bits | EPDDR SDR | Single stream | 0<br>63 | 0<br>62 | 0<br>61 | 0<br>60 | 0<br>59 | 0<br>58 | 0<br>57 | 0<br>56 | 0<br>55 | 0<br>54 | 0<br>53 | 0<br>52 | 0<br>51 | 0<br>50 | 0<br>49 | 0<br>48 |
| | | | 0<br>47 | 0<br>46 | 0<br>45 | 0<br>44 | 0<br>43 | 0<br>42 | 0<br>41 | 0<br>40 | 0<br>39 | 0<br>38 | 0<br>37 | 0<br>36 | 0<br>35 | 0<br>34 | 0<br>33 | 0<br>32 |
| | | | 0<br>31 | 0<br>30 | 0<br>29 | 0<br>28 | 0<br>27 | 0<br>26 | 0<br>25 | 0<br>24 | 0<br>23 | 0<br>22 | 0<br>21 | 0<br>20 | 0<br>19 | 0<br>18 | 0<br>17 | 0<br>16 |
| | | | 0<br>15 | 0<br>14 | 0<br>13 | 0<br>12 | 0<br>11 | 0<br>10 | 0<br>9 | 0<br>8 | b9<br>7 | b8<br>6 | b7<br>5 | b6<br>4 | b5<br>3 | b4<br>2 | b3<br>1 | b2<br>0 |
| 16 bits | EPDDR SDR | Single stream | 0<br>63 | 0<br>62 | 0<br>61 | 0<br>60 | 0<br>59 | 0<br>58 | 0<br>57 | 0<br>56 | 0<br>55 | 0<br>54 | 0<br>53 | 0<br>52 | 0<br>51 | 0<br>50 | 0<br>49 | 0<br>48 |
| | | | 0<br>47 | 0<br>46 | 0<br>45 | 0<br>44 | 0<br>43 | 0<br>42 | 0<br>41 | 0<br>40 | 0<br>39 | 0<br>38 | 0<br>37 | 0<br>36 | 0<br>35 | 0<br>34 | 0<br>33 | 0<br>32 |
| | | | 0<br>31 | 0<br>30 | 0<br>29 | 0<br>28 | 0<br>27 | 0<br>26 | 0<br>25 | 0<br>24 | 0<br>23 | 0<br>22 | 0<br>21 | 0<br>20 | 0<br>19 | 0<br>18 | 0<br>17 | 0<br>16 |
| | | | g9<br>15 | g8<br>14 | g7<br>13 | g6<br>12 | g5<br>11 | g4<br>10 | g3<br>9 | g2<br>8 | b9<br>7 | b8<br>6 | b7<br>5 | b6<br>4 | b5<br>3 | b4<br>2 | b3<br>1 | b2<br>0 |
| 20 bits | EPDDR SDR | Single stream | 0<br>63 | 0<br>62 | 0<br>61 | 0<br>60 | 0<br>59 | 0<br>58 | 0<br>57 | 0<br>56 | 0<br>55 | 0<br>54 | 0<br>53 | 0<br>52 | 0<br>51 | 0<br>50 | 0<br>49 | 0<br>48 |
| | | | 0<br>47 | 0<br>46 | 0<br>45 | 0<br>44 | 0<br>43 | 0<br>42 | 0<br>41 | 0<br>40 | 0<br>39 | 0<br>38 | 0<br>37 | 0<br>36 | 0<br>35 | 0<br>34 | 0<br>33 | 0<br>32 |

FIGURE 9

| | | 0 | 0 | 0 | 0 | 0 | 0 | 0 | 0 | 0 | 0 | 0 | 0 | g9 | g8 | g7 | g6 |
|---|---|---|---|---|---|---|---|---|---|---|---|---|---|---|---|---|---|
| | | 31 | 30 | 29 | 28 | 27 | 26 | 25 | 24 | 23 | 22 | 21 | 20 | 19 | 18 | 17 | 16 |
| | | g5 | g4 | g3 | g2 | g1 | g0 | b9 | b8 | b7 | b6 | b5 | b4 | b3 | b2 | b1 | b0 |
| | | 15 | 14 | 13 | 12 | 11 | 10 | 9 | 8 | 7 | 6 | 5 | 4 | 3 | 2 | 1 | 0 |
| 24 bits | | 0 | 0 | 0 | 0 | 0 | 0 | 0 | 0 | 0 | 0 | 0 | 0 | 0 | 0 | 0 | 0 |
| | | 63 | 62 | 61 | 60 | 59 | 58 | 57 | 56 | 55 | 54 | 53 | 52 | 51 | 50 | 49 | 48 |
| | | 0 | 0 | 0 | 0 | 0 | 0 | 0 | 0 | 0 | 0 | 0 | 0 | 0 | 0 | 0 | 0 |
| EPDDR SDR | Single stream | 47 | 46 | 45 | 44 | 43 | 42 | 41 | 40 | 39 | 38 | 37 | 36 | 35 | 34 | 33 | 32 |
| | | 0 | 0 | 0 | 0 | 0 | 0 | 0 | 0 | r9 | r8 | r7 | r6 | r5 | r4 | r3 | r2 |
| | | 31 | 30 | 29 | 28 | 27 | 26 | 25 | 24 | 23 | 22 | 21 | 20 | 19 | 18 | 17 | 16 |
| | | g9 | g8 | g7 | g6 | g5 | g4 | g3 | g2 | b9 | b8 | b7 | b6 | b5 | b4 | b3 | b2 |
| | | 15 | 14 | 13 | 12 | 11 | 10 | 9 | 8 | 7 | 6 | 5 | 4 | 3 | 2 | 1 | 0 |
| HHDDR | Single stream | 0 | 0 | 0 | 0 | 0 | 0 | 0 | 0 | 0 | 0 | 0 | 0 | 0 | 0 | 0 | 0 |
| | | 63 | 62 | 61 | 60 | 59 | 58 | 57 | 56 | 55 | 54 | 53 | 52 | 51 | 50 | 49 | 48 |
| | | 0 | 0 | 0 | 0 | 0 | 0 | 0 | 0 | 0 | 0 | 0 | 0 | 0 | 0 | 0 | 0 |
| | | 47 | 46 | 45 | 44 | 43 | 42 | 41 | 40 | 39 | 38 | 37 | 36 | 35 | 34 | 33 | 32 |
| | | 0 | 0 | 0 | 0 | 0 | 0 | 0 | 0 | r9 | g5 | r8 | g4 | r7 | g3 | r6 | g2 |
| | | 31 | 30 | 29 | 28 | 27 | 26 | 25 | 24 | 23 | 22 | 21 | 20 | 19 | 18 | 17 | 16 |
| | | r5 | b9 | r4 | b8 | r3 | b7 | r2 | b6 | g9 | b5 | g8 | b4 | g7 | b3 | g6 | b2 |
| | | 15 | 14 | 13 | 12 | 11 | 10 | 9 | 8 | 7 | 6 | 5 | 4 | 3 | 2 | 1 | 0 |
| HHDDR | Double width | 0 | 0 | 0 | 0 | 0 | 0 | 0 | 0 | 0 | 0 | 0 | 0 | 0 | 0 | 0 | 0 |
| | | 63 | 62 | 61 | 60 | 59 | 58 | 57 | 56 | 55 | 54 | 53 | 52 | 51 | 50 | 49 | 48 |
| | | pix1 r9 | pix1 g5 | pix1 r8 | pix1 g4 | pix1 r7 | pix1 g3 | pix1 r6 | pix1 g2 | pix1 r5 | pix1 b9 | pix1 r4 | pix1 b8 | pix1 r3 | pix1 b7 | pix1 r2 | pix1 b6 |
| | | 47 | 46 | 45 | 44 | 43 | 42 | 41 | 40 | 39 | 38 | 37 | 36 | 35 | 34 | 33 | 32 |

FIGURE 9
(continued)

| | | | | | | | | | | | | | | | | | |
|---|---|---|---|---|---|---|---|---|---|---|---|---|---|---|---|---|---|
| | | | pix1 g9 31 | pix1 b5 30 | pix1 g8 29 | pix1 b4 28 | pix1 g7 27 | pix1 b3 26 | pix1 g6 25 | pix1 b2 24 | pix0 r9 23 | pix0 g5 22 | pix0 r8 21 | pix0 g4 20 | pix0 r7 19 | pix0 g3 18 | pix0 r6 17 | pix0 g2 16 |
| | | | pix0 r5 15 | pix0 b9 14 | pix0 r4 13 | pix0 b8 12 | pix0 r3 11 | pix0 b7 10 | pix0 r2 9 | pix0 b6 8 | pix0 g9 7 | pix0 b5 6 | pix0 g8 5 | pix0 b4 4 | pix0 g7 3 | pix0 b3 2 | pix0 g6 1 | pix0 b2 0 |
| HHDDR | Dual stream (clock 1) | | 0 63 | 0 62 | 0 61 | 0 60 | 0 59 | 0 58 | 0 57 | 0 56 | 0 55 | 0 54 | 0 53 | 0 52 | 0 51 | 0 50 | 0 49 | 0 48 |
| | | | 0 47 | 0 46 | 0 45 | 0 44 | 0 43 | 0 42 | 0 41 | 0 40 | 0 39 | 0 38 | 0 37 | 0 36 | 0 35 | 0 34 | 0 33 | 0 32 |
| | | | 0 31 | 0 30 | 0 29 | 0 28 | 0 27 | 0 26 | 0 25 | 0 24 | s2 g5 23 | s1 g5 22 | s2 g4 21 | s1 g4 20 | s2 g3 19 | s1 g3 18 | s2 g2 17 | s1 g2 16 |
| | | | s2 b9 15 | s1 b9 14 | s2 b8 13 | s1 b8 12 | s2 b7 11 | s1 b7 10 | s2 b6 9 | s1 b6 8 | s2 b5 7 | s1 b5 6 | s2 b4 5 | s1 b4 4 | s2 b3 3 | s1 b3 2 | s2 b2 1 | s1 b2 0 |
| HHDDR | Dual stream (clock 2) | | 0 63 | 0 62 | 0 61 | 0 60 | 0 59 | 0 58 | 0 57 | 0 56 | 0 55 | 0 54 | 0 53 | 0 52 | 0 51 | 0 50 | 0 49 | 0 48 |
| | | | 0 47 | 0 46 | 0 45 | 0 44 | 0 43 | 0 42 | 0 41 | 0 40 | 0 39 | 0 38 | 0 37 | 0 36 | 0 35 | 0 34 | 0 33 | 0 32 |
| | | | 0 31 | 0 30 | 0 29 | 0 28 | 0 27 | 0 26 | 0 25 | 0 24 | s2 r9 23 | s1 r9 22 | s2 r8 21 | s1 r8 20 | s2 r7 19 | s1 r7 18 | s2 r6 17 | s1 r6 16 |
| | | | s2 r5 15 | s1 r5 14 | s2 r4 13 | s1 r4 12 | s2 r3 11 | s1 r3 10 | s2 r2 9 | s1 r2 8 | s2 g9 7 | s1 g9 6 | s2 g8 5 | s1 g8 4 | s2 g7 3 | s1 g7 2 | s2 g6 1 | s1 g6 0 |

FIGURE 9 (continued)

| Output format | Output mode | Output rate | block 5 (pad 23:20) | block 4 (pad 19:16) | block 3 (pad 15:12) | block 2 (pad 11:8) | block 1 (pad 7:4) | block 0 (pad 3:0) |
|---|---|---|---|---|---|---|---|---|
| 8 bits | | SDR | | | | | X | X |
| | | DDR | | | | | | X |
| 16 bits | | SDR | | | X | X | X | X |
| | | DDR | | | | | X | X |
| 20 bits | | SDR | | X | X | X | X | X |
| | | DDR | | | | X | X | X |
| 24 bits | | SDR | X | X | X | X | X | X |
| | | DDR | | | | X | X | X |
| 30 bits | | SDR | X | X | X | X | X | X |
| | | DDR | | | X | X | X | X |
| 32 bits | | SDR | X | X | X | X | X | X |
| | | DDR | | | X | X | X | X |
| 36 bits | | SDR | X | X | X | X | X | X |
| | | DDR | | X | X | X | X | X |
| 40 bits | | SDR | X | X | X | X | X | X |
| | | DDR | | X | X | X | X | X |
| 48 bits | | SDR | X | X | X | X | X | X |
| 48 bits | Double width | DDR | X | X | X | X | X | X |
| 64 bits | Double width | DDR | X | X | X | X | X | X |

FIGURE 10A

| Output Rate | block 5 (pad 23:20) | | block 4 (pad 19:16) | | block 3 (pad 15:12) | | block 2 (pad 11:8) | | block 1 (pad 7:4) | | block 0 (pad 3:0) | |
|---|---|---|---|---|---|---|---|---|---|---|---|---|
| | odd | even | odd | even | odd | even | odd | even | odd | even | odd | even |
| SDR | [23:20] | [23:20] | [19:16] | [19:16] | [15:12] | [15:12] | [11:8] | [11:8] | [7:4] | [7:4] | [3:0] | [3:0] |
| DDR | [47,45, 43,41] | [46,44, 42,40] | [39,37, 35,33] | [38,36, 34,32] | [31,29, 27,25] | [30,28, 26,24] | [23,21, 19,17] | [22,20, 18,16] | [15,13, 11,9] | [14,12, 10,8] | [7,5,3,1] | [6,4,2,0] |

INPUT/OUTPUT PIN ALLOCATION FOR DATA STREAMS OF VARIABLE WIDTHS

CROSS-REFERENCE TO RELATED APPLICATIONS

This application is a divisional of U.S. patent application Ser. No. 12/047,067 filed on Mar. 12, 2008, the specifications of which are hereby incorporated by reference.

TECHNICAL FIELD

The present invention relates to the field of inputting and outputting multiple data streams of variable widths.

BACKGROUND OF THE INVENTION

A port serves as an interface between two devices and allows communication between two processing systems, or two sub-modules included in a processing system. In general, a port may be used to input or output data from a chip. Alternatively a port may be used to concurrently output and input data into a processing system. A port may be digital or analog according to the type of data transferred.

Graphics systems are examples of processing systems that receive data from external processors, application-specific integrated circuits (ASICs), acquisition devices and others through an input port. Other graphics systems use an output port to output data to external processors, ASICs, display devices (such as monitors, display walls, etc), and others. Yet other graphics systems may include internal ports used to communicate between their sub-modules.

Each manufacturer has a different format and protocol to output or input data. The term "protocol" is very generic and is used for many different communication methods. A protocol may define the packet structure of the data transmitted, the control commands that manage the session, or both. As an example, protocols may differ from each other by the number of pins included in the port used to transfer data, the clock rate at which data is transferred, the data output format, the output rate and mode, and the number of streams that a port may transfer. One of the standards used in the industry is a 12 pin interface using double data rate (DDR), which uses both clock edges to transfer 24 bits of data on 12 pins. An alternative interface is a 24 pin interface using single data rate (SDR), thus using only the rising clock edge to transfer 24 bits of data on 24 pins.

There is a need for a port that can be configurable to support a variable number of data streams transferred and which may support a plurality of existing input/output protocols.

SUMMARY OF THE INVENTION

The present system and method allow for inputs and/or outputs that are programmable in size. The system and method are also adaptable to a large number of output formats.

In accordance with a first broad aspect, there is provided a method for outputting a plurality of data streams, the method comprising: receiving from at least one data path the data streams; mapping the data steams to a plurality of transfer blocks as a function of a respective output format, output rate, and additional output parameters, each of the transfer blocks being connected to a plurality of output pins and independently controlled by a given clock; and outputting the data streams via the transfer blocks to the output pins using a corresponding clock rate for each of the transfer blocks.

In accordance with a second broad aspect, there is provided a system for outputting a plurality of data streams, the system comprising: a plurality of transfer blocks, each of the transfer blocks being connected to a given number of output pins and independently controlled by a given clock; and a mapping module adapted to receive the data streams from at least one data path and map each one to at least one of the plurality of transfer blocks as a function of a respective output format, output rate, and additional output parameters, the transfer blocks being used for outputting the data streams to the output pins using a corresponding clock rate for each of the transfer blocks.

In accordance with a third broad aspect, there is provided a method for outputting a plurality of data streams, the method comprising: receiving from at least one data path the data streams; mapping the data streams to a plurality of output pins as a function of a respective output format, output rate, and additional output parameters; and outputting the data streams to the output pins using a clock, at least one of the output pins receiving two independent data streams, one of the two independent data streams being output on a rising edge of the clock and another of the two independent data streams being output on a falling edge of the clock.

In accordance with a fourth broad aspect, there is provided a method for receiving a plurality of data streams, the method comprising: receiving the data streams into a plurality of input pins, each of the input pins being connected to a plurality of transfer blocks, the transfer blocks being independently controlled by a given clock; mapping the data streams from the plurality of transfer blocks to at least one data path as a function of a respective input format, input rate, and additional input parameters; and sending the data streams to the at least one data path.

In accordance with a fifth broad aspect, there is provided a system for receiving a plurality of data streams, the system comprising: a plurality of transfer blocks, each of the transfer blocks being connected to a given number of input pins and independently controlled by a given clock; and a mapping module adapted to receive the data streams from the transfer blocks and reconstruct the data streams as a function of a respective input format, input rate, and additional input parameters, and to send the data streams to at least one data path.

In accordance with a sixth broad aspect, there is provided a method for receiving a plurality of data streams, the method comprising: receiving the data streams into a plurality of input pins, at least one of the input pins receiving two independent data streams, one of the two independent data streams being received on a rising edge of a clock and another of the two independent data streams being received on a falling edge of the clock; and mapping the two independent data streams to two data paths as a function of a respective input format, input rate, and additional input parameters.

BRIEF DESCRIPTION OF THE DRAWINGS

Further features and advantages of the present invention will become apparent from the following detailed description, taken in combination with the appended drawings, in which:

FIGS. 7A-7B are tables showing the formatting and positioning of data performed by a mapping module, in accordance with an embodiment of the present invention;

FIG. 8 is a table showing the output of data through output pins of a digital output port in accordance with an embodiment of the present invention;

FIG. 9 is a table illustrating the formatting of data in a formatting sub-module in accordance with an embodiment of the present invention;

FIGS. 10A-10B are tables showing positioning of formatted data streams, in accordance with an embodiment of the invention;

FIG. 11 shows a double data rate mapping pattern for a 24 bit output in accordance with an embodiment of the present invention;

DETAILED DESCRIPTION

While the description makes reference to input and output controllers for a graphics environment, it should be noted that this is merely one embodiment for which the described system and method may be applied. Data streams can be received from any data path and output to any type of digital output port. Similarly, data streams can be received from any type of digital input port and transferred to any type of data path. For example, the output port may be used to output data from an audio controller (outputs audio data from an audio processing system), or it may be connected to a Digital Signal Processor (DSP), to a display controller, or output controller of a graphics processing system. The same applies to an input port. The ports are used to connect a system to an interface to communicate with many other types of processing system, display device, speaker, etc.

Figure 1:
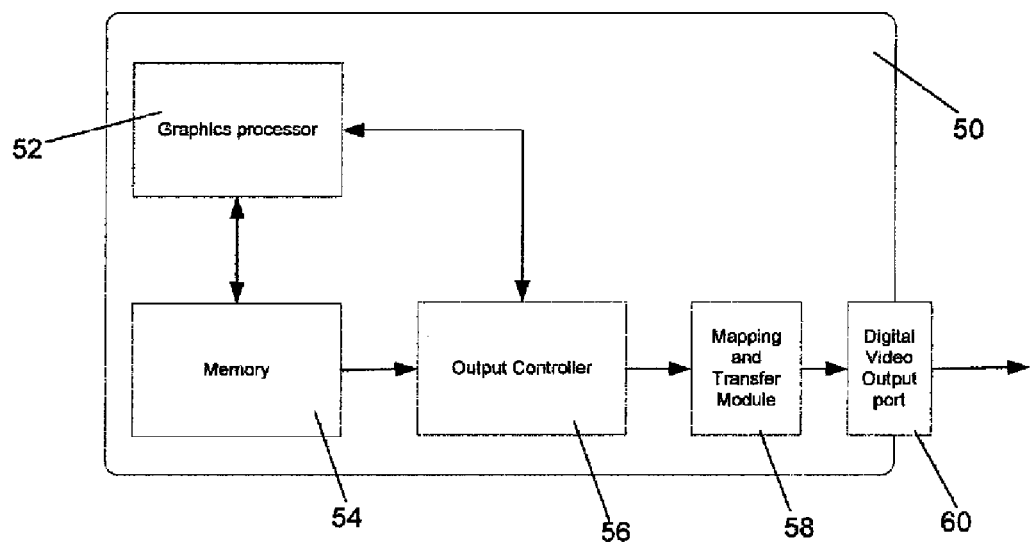
FIG. 1 is a block diagram of a graphics system including a module for managing multiple output data streams as per an embodiment of the present invention.

FIG. 1 is a block diagram illustrating one embodiment of a graphics processing system 50, as may be included in a standard computer (e.g. desktop computer, laptop, etc). As illustrated in FIG. 1, the graphics processing system 50 may include a graphics processor 52 (or graphics processing unit) that processes graphics or video data and stores it in memory 54. The memory 54 may be local memory and may be referred to as a frame buffer. In some other embodiments, the memory 54 may be located in system memory. The output controller 56 may request data from the memory 54 or may receive data from the graphics processor 52, further it may set it with appropriate parameters (synchronization signals, resolution, etc) to be output to a monitor or to be sent to an external processing system that may further process or store the data (e.g. a video editing system, a DVD recorder, an image processing system, etc). In some other embodiments, the output controller may further process data, as an example data may be scaled or a gamma correction may be applied to data. From the output controller 56, the data is sent to the mapping and transfer module 58 where the streams of incoming data are processed to have a desired output format and a desired output rate. The processed data is output using a digital output port 60.

Figure 2:
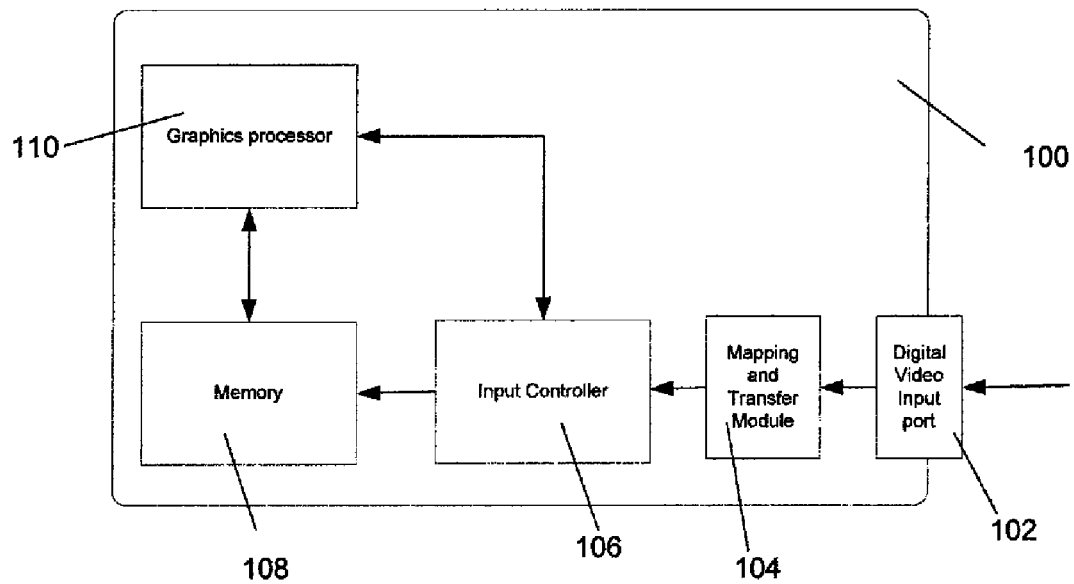
FIG. 2 is a block diagram of a graphics system including a module for managing multiple input data streams as per an embodiment of the present invention.

FIG. 2 is similar to FIG. 1, except that it illustrates an embodiment for receiving data streams instead of outputting data streams. The data streams are received by a graphics processing system 100 at the input port 102, either from another processing system or from a data stream source such as a TV tuner, DVD player, CD player, etc. In some embodiments, the data streams may be received from another graphics processing system or simply from another stage of the same graphics processing system. The received data streams are processed by the digital input port 102 and the mapping and transfer module 104 to have a desired format and rate. The processed data streams are then transferred to an input controller 106. From there, the data streams are sent off along at least one data path which may include a memory 108 and a graphics processor 110. In some embodiments, the data streams are stored in memory and are then accessed by the graphics processor. In other embodiments, the data streams are sent to the graphics processor without being stored in memory.

While in FIGS. 1 and 2, mapping and transfer modules 58, 104 are separate from input and output controllers 56, 106, respectively, it should be understood that mapping and transfer modules 58, 104 may be integrated in output controller 56 and input controller 106, respectively. Digital output port 60 and digital input port 102 may also be considered as being part of mapping and transfer module 58 and mapping and transfer module 104, respectively. In another embodiment, mapping and transfer module 58 and digital output port 60 may be integrated in output controller 56 and mapping and transfer module 104 and digital input port 102 may be integrated in input controller 106. As an example, in a graphics processing system, output controller 56 and mapping and transfer module 58 may be included in a display controller.

The output controller illustrated in FIG. 1 may process a plurality of output streams and may support multiple output formats, multiple output modes and multiple output rates. Similarly, the input controller illustrated in FIG. 2 may receive a plurality of input streams and may support multiple input formats, input modes and input rates.

Figure 3:
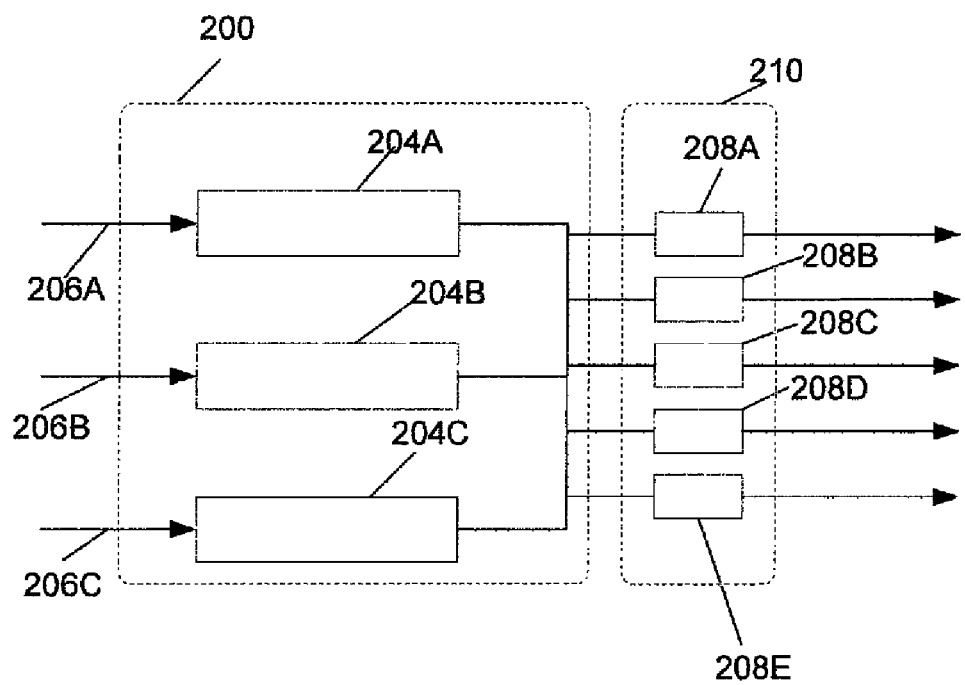
FIG. 3 illustrates a mapping module comprising three mapping sub-modules connected to all of the transfer blocks, in accordance with an embodiment of the present invention.

The mapping and transfer module 58, illustrated in FIG. 1, is designed to send a plurality of data streams received from at least one data path to appropriate output pins of the digital output port. Many implementations are possible for the mapping and transfer module. FIG. 3 illustrates one embodiment of a device allocating data streams to output pins and comprising a mapping module 200, a set of transfer blocks 210 connected to a digital output port (not shown in FIG. 3). In this embodiment, the mapping module comprises three mapping sub-modules 204A, 204B and 204C, each one receiving one data stream 206A, 206B and 206C respectively. Data streams 206A, 206B and 206C may come from the same data path or from different data paths. In some embodiments, at least two of the data streams 206A, 206B and 206C are identical while in other embodiments the three data streams 206A, 206B and 206C are different. In the embodiment illustrated at FIG. 3, the output pins of the digital output port (not shown in the figure) are connected to five transfer blocks 208A, 208B, 208C, 208D and 208E. In this embodiment, the mapping sub-modules 204A, 204B, and 204C are all connected to all of the transfer blocks 208A-208E. Each mapping sub-module 204A-204C formats and positions the bits of the single data stream 206A-206C it receives and sends them to an appropriate subset of transfer blocks 208A-208E according to an output format, an output rate and an output mode.

Figure 4:
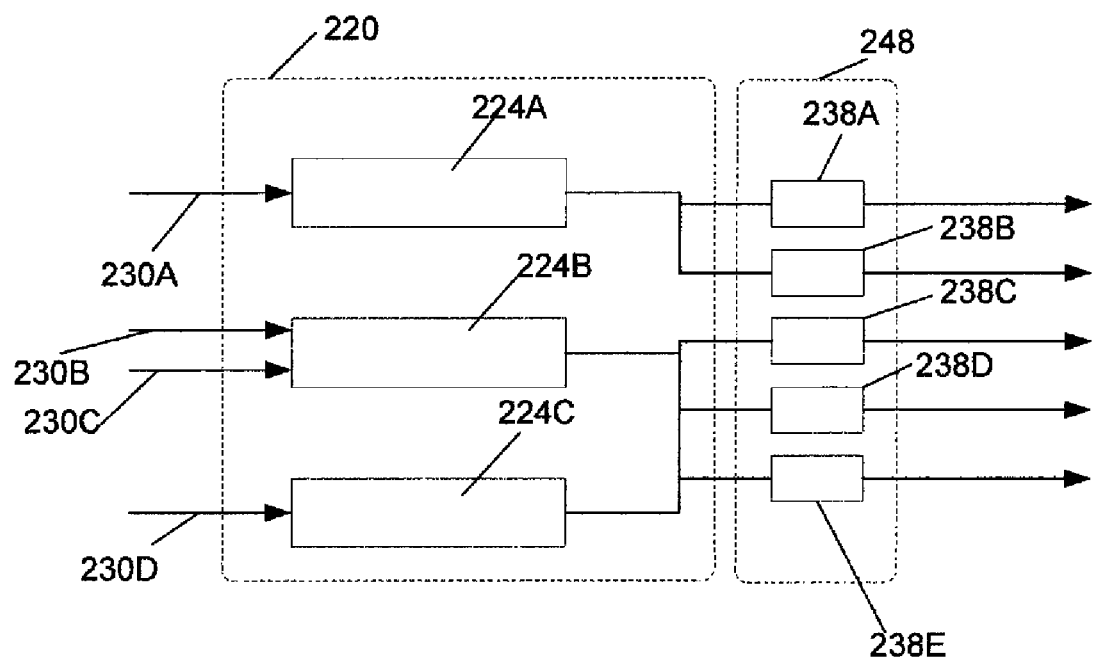
FIG. 4 illustrates a mapping module comprising three mapping sub-modules connected to different transfer blocks, in accordance with an embodiment of the present invention.

FIG. 4 illustrates another embodiment of a device allocating data streams to output pins and comprising a mapping module 220 and a set of transfer blocks 248 connected to a digital output port (not shown in FIG. 4). The mapping module 220 comprises 3 mapping sub-modules 224A, 224B, 224C. Mapping sub-module 224A receives one data stream 230A, mapping sub-module 224B receives two data streams 230A, 230B, coming from different paths, and mapping sub-module 224C receives one data stream 230D. In this example, transfer blocks 238A and 238B are only connected to mapping sub-module 224A and transfer blocks 238C, 238D and 238E are only connected to mapping sub-modules 224B and 224C. Mapping sub-module 224A formats the bits of data stream 230A and may position them to output pins connected to transfer blocks 238A and 238B. Mapping sub-module 224B formats the bits of data streams 230B and 230C and may position them to output pins connected to transfer blocks 238C, 238D, and 238E. Mapping sub-module 224C formats the bits of data stream 230D and positions them to pins connected to transfer blocks 238C, 238D, and 238E.

Figure 5:
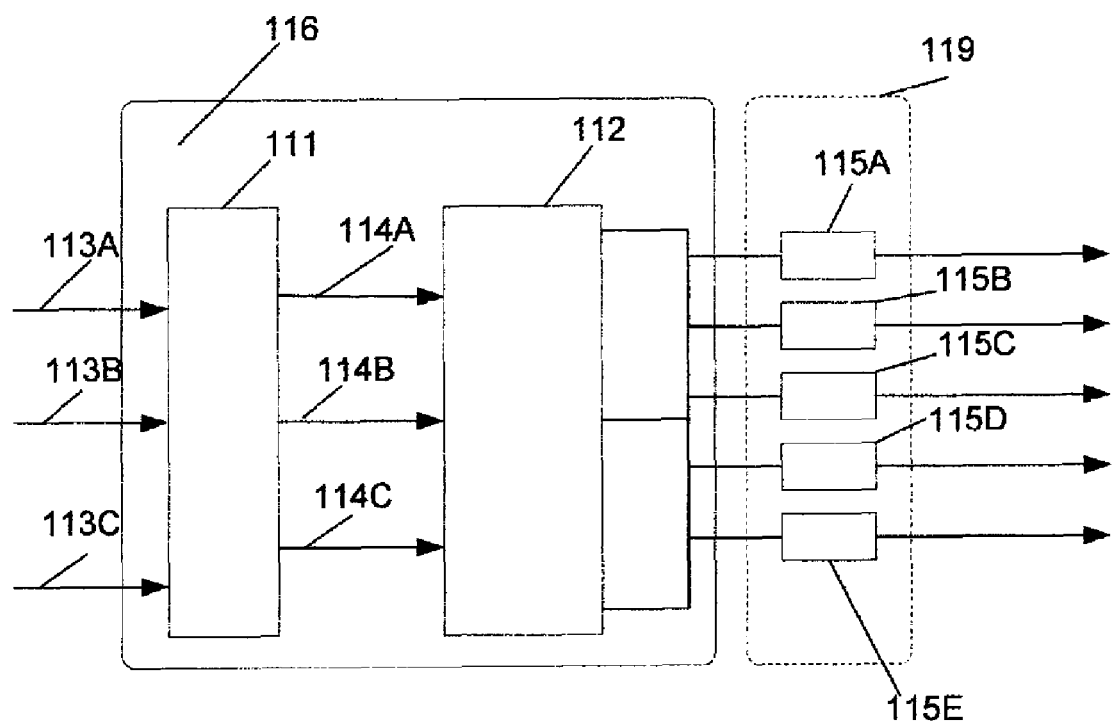
FIG. 5 illustrates a mapping module comprising a formatting sub-module and a positioning sub-module connected to the transfer blocks, according to an embodiment of the present invention.

FIG. 5 illustrates another embodiment of a device allocating data streams to output pins and comprising a mapping module 116 and a set of transfer blocks 119 connected to a digital output port (not shown in FIG. 5). In this example, mapping module 116 comprises a formatting module 111 and a positioning module 112. Formatting module 111 receives multiple data streams 113A, 113B and 113C via multiple data paths and formats them. The formatted streams 114A, 114B and 114C are then sent to positioning module 112 which converts the formatted streams 114A, 114B and 114C into positioned streams. The positioned streams are then sent to transfer blocks 115A, 115B, 115C, 115D and 115E which transfer data to a plurality of pins of a digital output port (not shown in FIG. 5).

Figure 6:
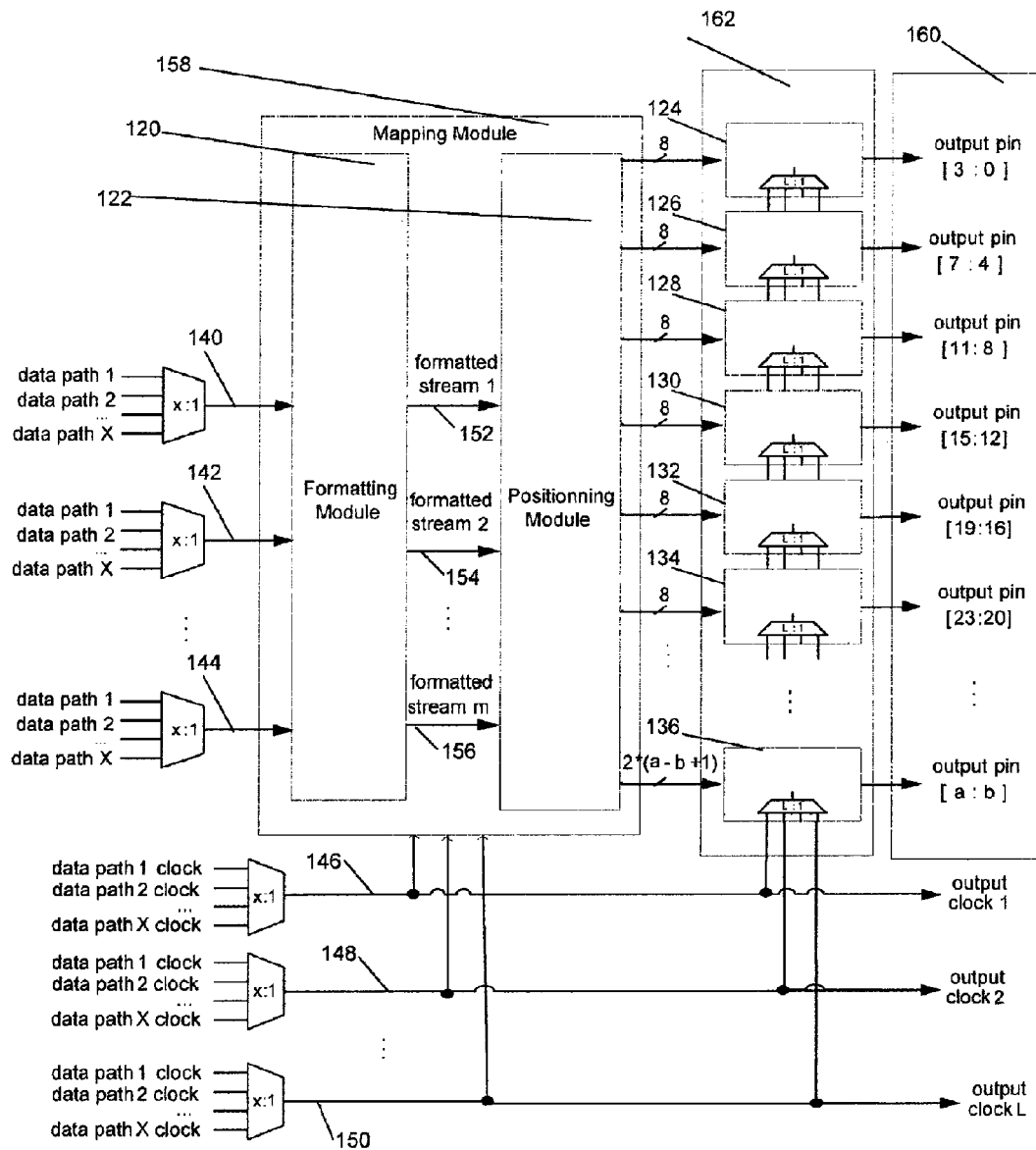
FIG. 6 is a detailed block diagram of a programmable output system in accordance with an embodiment of the present invention.

FIG. 6 is a more detailed block diagram illustrating an embodiment of the mapping and transfer module 58 connected to the digital output port 60 as shown in FIG. 1. According to the embodiment illustrated in FIG. 6, mapping module 158 is connected to digital output port 160 through a set of transfer blocks 162. Digital output port 160 comprises a plurality of output pins connected to a set of transfer blocks 124, 126, 128, 130, 132, 134 and 136. Transfer blocks 124, 126, 128, 130, 132, 134 and 136 are the circuitry used to transfer data to an output pin at a given clock rate. The output pins are grouped together by transfer block. In this embodiment, each transfer block 124, 126, 128, 130, 132, 134 and 136 is connected to four output pins. Transfer block 124 is connected to output pins 0 to 3, transfer block 126 is connected to output pins 4 to 7, and the last transfer block 136 is connected to output pins a to b. In this embodiment, the output port contains a totality of a+1 pins connected to N transfer blocks. Further, each transfer block is connected to four output pins which are consequently controlled by the same output clock.

According to one embodiment, mapping module 158, as illustrated in FIG. 6, includes a formatting module 120 and a positioning module 122. Mapping module 158 may receive a plurality of data streams via formatting module 120. Each received stream may be of a different format. In this example, mapping module 158 receives a first data stream 140, a second data stream 142, . . . , and a last data stream 144. Data streams 140, 142, . . . , 144 can come from multiple data paths. Data streams may come from a local or system memory or from a processing unit. As an example, data streams 140, 142 and 144 may be provided by an output controller 56 of a graphics processing system 50 as illustrated in FIG. 1. Mapping module 158 also receives clock signals 146, 148, 150 corresponding to data streams 140, 142, 144, respectively. Formatting module 120 receives streams 140, 142, 144 and their corresponding clock signals 146, 148, 150 and formats these streams according to an output format, an output rate, and an output mode. This step results in the creation of a first formatted data stream 152, a second formatted data stream 154 and a plurality of other formatted data streams (not shown in FIG. 6), where data stream 156 is the $M^{th}$ formatted stream. All formatted streams are sent to positioning module 122. Positioning of each bit of the plurality of data streams (e.g. streams 152, 154 and 156) to an output pin occurs at this stage. Each positioned bit is assigned to a transfer block which transfers it to an output pin. Each one of transfer blocks 124, 126, 128, 130, 132, 134 and 136 is connected to 4 output pins and is independently controlled by a given clock. In this embodiment, N transfer blocks are present, each connected to 4 output pins, for a total of 4*N output pins. Transfer blocks 124, 126, 128, 130, 132, 134 and 136 are used to output the mapped data streams using a desired output rate, according to a chosen clock. According to one embodiment, each clock used to output a mapped data stream is the same as the clock used to format and position that stream.

In one embodiment, a mapping module may be configured to output data according to a plurality of output rates. In general an output rate determines if data is sent on one edge of the clock (Single Data Rate—SDR) or on both edges of the clock (Double Data Rate—DDR). As an example, in SDR, one bit of data is transferred on every rising edge of the clock. In DDR, a first bit of data is transferred on the rising edge of the clock and a second bit of data is transferred on the falling edge of the clock. Rates in DDR may be of different types. For example, when data is a bus vector, an "edge-pair double data rate" (EPDDR), means that even bits of the vector are transferred on the rising edge of a clock, and odd bits of the vector are transferred on the falling edge of the clock. Another type of DDR is a half-half double data rate (HHDDR), meaning half the bits of the vector are transferred on the rising edge of a clock and the other half are transferred on the falling edge of a clock. In one embodiment, a mapping module may support different types of rates (SDR, HHDDR, EPDDR), and may further support other types of rates not cited here.

A mapping module may also be configured according to an output mode. In general, an output mode determines if data output on the same pins comes from one data path or from a plurality of data paths. One possible output mode is single stream mode in which one data stream is output on a set of output pins. Another possible output mode is multi-stream mode in which a plurality of streams is output using the same output pins. Dual Stream mode is a particular example of multi-stream mode and it consists in having two data streams output using the same set of output pins. One data stream uses the rising edge of a clock, while the other stream uses the falling edge of the clock. A mapping module may support a plurality of output modes. In one embodiment, a mapping module is included in a graphics processing system and may support a dual stream mode and a double width mode. In a graphics environment, double width mode allows odd and even pixels of a stream to be output in parallel. The odd pixels are always output on the same pins and the even pixels are always output on the same pins, different from the pins for the odd pixels.

In one embodiment, mapping and transfer module 58 receives the data streams with a data stream format and data may be output with another format, which can be referred to as the output format. Stream format and output format may be different. For example, in a graphics processing system, the data stream format may be 10 bits per color component (Alpha, Blue, Red, Green) for a total of 40 bits per pixel and the output format may be 8 bits, 24 bits, etc, where the bits of the output stream are a selection of the bits of the stream received by the mapping module. Mapping module and transfer 58 is configured to process data streams according to an output format.

In some embodiments, positioning is done as a function of the output format, the output rate, the output mode and additional output parameters such as the number of outputs requested. Position of a starting block for a given stream of output data is another example of additional output parameters. According to the embodiment illustrated in FIG. 6, positioning module 122 determines for each formatted stream 152, 154, 156 (where each stream may include data from one data stream or from a plurality of data streams if multiple streams are output on the same pins) the number of necessary transfer blocks and the position of the transfer blocks according to parameters such as an output mode, an output format and an output rate.

A positioned stream is then sent to a set of transfer blocks. Each transfer block associated with a positioned stream selects an appropriate clock to output data. All output pins connected to a transfer block use the same clock.

It should be understood that the number of output pins, the number of data streams, the number of transfer blocks and the number of output pins per transfer block illustrated in the above figures are exemplary only. As an example in a graphics processing system, an output port may include 48 pins connected to 12 transfer blocks and the mapping module may receive up to 4 data streams provided by different data paths.

FIG. 7A illustrates an example of how the formatting can occur in the formatting module 120. In this example, the mapping module 158 receives 2 streams of data s1 and s2 coming from different paths and having the same width and the same clock rate. These two streams s1 and s2 contain 8 bits having the following values: s1(0) . . . s1(7) and s2(0) . . . s2(7), respectively. These streams are to be output with a DDR output rate using the same 8 output pins. Formatting module 120 formats the streams s1 and s2 according to the table illustrated in FIG. 7A. Formatting is performed according to the output format, the output rate, and the output mode. In the example illustrated in FIG. 7A, the output format is 8 bits, the output rate is DDR and the output mode is dual stream. Formatting module 120 creates a vector of a width large enough to receive all bits of streams s1 and s2. In this example, a vector of 16 positions is created. Formatting module 120 assigns the eight bits s1(0) . . . s1(7) to the even positions of the vector and assigns the eight bits s2(0) . . . s2(7) to the odd positions of the vector. In other embodiments, the formatting module may be configured to assign the bits of s1 and s2 to different locations of the vector.

This vector is then sent to positioning module 122. Positioning of the bits is achieved as a function of the output format, the output rate, and additional output parameters. For example, positioning module 122 may choose transfer blocks 126 and 128 to output the bits on output port pins 4 to 11. FIG. 7B illustrates an example of the assignation of the bits of a positioned stream to output pins. As the output rate is DDR, positioning module 122 assigns s1(0) . . . s1(7) to input pins 0, 2, 4, and 6 of transfer block 126 and 128 which are connected to pins 4, 5, 6, 7, 8, 9, 10 and 11 of the output port, and s2(0) . . . s2(7) are assigned to input pins 1, 3, 5, and 7 of the same transfer blocks 126 and 128. The bits of stream s1, (s1(0) . . . s1(7)), are sent on the rising edge of the clock while the bits of stream s2, (s2(0) . . . s2(7)), are sent on the falling edge of the clock. The mapping, achieved by formatting module 120 and positioning module 122, enables to output streams s1 and s2 using the same output pins. FIG. 8, illustrates s1 and s2 output through the pins 4 to 11 of a digital output port such that bits of s1 are output on the rising edge of the clock cycle, and bits of s2 are output on the falling edge of the clock cycle.

Formatting and positioning methods described in FIGS. 7 and 8 are exemplary only. Any method for formatting and positioning the streams of data may be used.

In some embodiments, formatting module and positioning module may include a plurality of sub-modules. In one embodiment, the formatting module includes a plurality of sub-modules, such that a sub-module may process data streams to be output on the same output pins. A detailed example of how the formatting occurs, according to this embodiment, is illustrated in FIG. 9. FIG. 9 presents examples of formatting performed by a formatting sub-module. The table of FIG. 9 presents the formatted output data as a function of the output format, the output mode and the output rate. In this example, the formatting sub-module creates a data vector of 64 bits according to the output format, the output rate and the output mode. It should be noted that the vector used for the formatting step may be larger or smaller than 64 bits. In this case, the width has been chosen according to a given digital output port providing a desired output size. In this embodiment, each formatting sub-module receives one or more data streams and sends to the positioning module a formatted stream which is a combination of all the received data streams.

The table shown in FIG. 9 illustrates the formatting for output formats of 8 bits, 16 bits, 20 bits, and 24 bits performed by a formatting sub-module included in a mapping module of a graphics processing system. Other output formats, such as 30 bits, 32 bits, 36 bits, 40 bits, 48 bits, 64 bits, etc, may also be possible but are not shown in FIG. 9. In general in a graphics processing system, data output is a set of pixels forming an image. In the table shown in FIG. 9, r0 . . . r9 refer to the 10 bits of the red component of a pixel, b0 . . . b9 and g0 . . . g9 refer to 10 bits of the blue and green components respectively. SDR and a plurality of DDR output rates may be used to configure the formatting module. Previously described edge-pair double data rate and half-half double data rate are examples of types of DDR output rates that may be used. In the illustrated example, output modes may be single stream, dual stream or double width mode. In some other embodiments other output modes may be defined. As illustrated in FIG. 9, for a dual stream mode and SDR output rate the formatting sub-module may assign half of the stream of processed data on the falling edge of the clock and the other half of the stream of data on the rising edge of the clock. For a dual stream mode with DDR output rate, the formatting sub-module may assign a first stream of processed data on the falling edge of the clock and a second stream of data on the rising edge of the clock. Other output modes are also possible. As shown in FIG. 9, if the formatting sub-module receives a stream of 8 bits b2 . . . b9 (in this example, b2 . . . b9 refer to 8 bits of the blue component of a pixel) to be output in an 8 bit stream, the values of the received bits are stored in the vector at positions 0 . . . 7. For an output format of 24 bits, a double width mode and a half-half double data rate, the formatting sub-module receives data concerning two successive pixels pix0 and pix1 of a data stream and assigns the bits of pix0 to the first 24 positions of the vector and the bits of pix1 to the next 24 positions in the vector.

In FIG. 9, taking the example of an output format of 24 bits of a single stream mode and an edge pair double data rate, the formatting sub-module receives a stream of 24 bits b2 . . . b9, g2 . . . g9 and r2 . . . r9. The formatting sub-module assigns the bits of the received stream to the first 24 positions of the vector and groups them by successive pairs as shown in FIG. 9. A formatted stream is sent to a positioning module.

In one embodiment, a formatting module may include more than one formatting sub-module and each sub-module may process data streams according to a table as shown in FIG. 9. In some embodiments, each formatting sub-module may support output formats, output rates and output modes that are different from the formats, rates and modes supported by the other sub-modules. In some other embodiments, each formatting sub-module may format data streams to be output on the entire set of output pins or on a subset of output pins.

Figures 10B, 11:
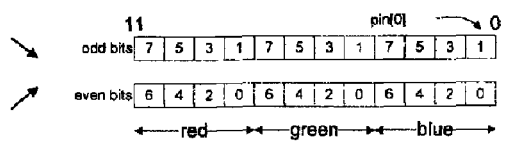

Formatted streams are then sent to a positioning module included in the mapping module, which sends data to appropriate transfer blocks. In one example, there are 12 transfer blocks available for data mapping and each transfer block is connected to 4 output pins of the digital output port. That means a total of 48 output pins. Depending on the output rate (single data rate/double data rate), each pin can handle 1 or 2 data bits per clock cycle. In this embodiment, a transfer block is connected to 4 output pins that are linked together. When a transfer block is selected by a positioning module, all the output pins of the block are associated to that output, even if all the output pins are not used inside the transfer block. A single clock is used in a transfer block to output data on the four output pins. When using a double date rate, each transfer block can output 8 bits at each clock cycle. For example, the odd bits [1,3,5,7] of the formatting module are sent on the clock falling edge, the even bits [0,2,4,6] are sent on the clock rising edge. FIG. 11 shows this pattern for 24 output bits format where the odd bits [1,3,5,7] of each color component (red, green, blue) of a pixel are output on the falling edge of the clock and the even bits [0,2,4,6] of each color component of a pixel are output on the rising edge of the clock.

FIGS. 10A and 10B illustrate an embodiment of positioning that may be performed by a positioning module. According to this embodiment, the positioning module (e.g. the one illustrated in FIG. 6) receives a set of formatted streams, from a formatting module or from a set of formatting sub-modules, and determines the transfer blocks that should receive each formatted stream. FIG. 10A provides an example of positioning performed for output formats of 8 bits, 16 bits, 20 bits, . . . , 64 bits. According to the output format, the output mode and the output rate associated with the formatted stream, a positioning module chooses the transfer blocks that may receive the stream. For example for an 8 bit stream using SDR output rate, block 0 and block 1 are selected. In this embodiment, the least significant bits (LSB) of the stream are sent to block 0 and the most significant bits (MSB) are sent to block 1. In this example the number of transfer blocks used is 12 and the digital output port may output up to 64 bits using DDR output rate. A person skilled in the art would understand that 5 transfer blocks (as illustrated in FIG. 10A) may not be enough to support output formats as 48 bits or 64 bits, . . . , and that a similar table associating data streams to transfer blocks 6, 7, . . . , up to transfer block 11 is required. FIG. 10B shows how bits of a formatted data stream are assigned to the appropriate pins in each transfer block. A similar table may be required for transfer block 6, transfer block 7 . . . up to transfer block 11, when the digital output port is connected to 12 transfer blocks.

The output format and output rate dictate how many transfer blocks are necessary, and the number of blocks required is rounded up. For example, if the output format mode is 36 bits and the output rate is DDR, that means 36 bits/8 bits per block=4.5 blocks. So, 5 blocks are used and the extra pins are kept at '0' (as shown in the formatting tables of FIG. 9). Several transfer blocks may be grouped together to create digital video output ports. Each digital video output port may be programmable as to which transfer block is used as a starting position.

In one embodiment, a mapping module may include 4 formatting sub-modules, a positioning module, 12 transfer blocks and each transfer block is connected to 4 pins of a digital output port. In this embodiment, each formatting sub-module may receive one or two data streams and format the received streams according to an output format, an output mode and an output rate. Further, each formatting sub-module may then send the formatted data stream to the positioning module. The positioning module associates each formatted stream received from the four formatting sub-module with an appropriate sub-set of transfer blocks. In one embodiment, a formatting sub-module may be associated to a sub-set of transfer blocks. For example, in one embodiment a first formatting sub-module may send data to all 12 transfer blocks 0 . . . 11 while a second formatting sub-module has access to only 5 transfer blocks (transfer blocks 3 to 7, for example), a third formatting sub-module has access to 6 transfer blocks (transfer blocks 6 to 11, for example) and a fourth formatting sub-module is only connected to 3 transfer blocks (transfer blocks 9 to 11, for example). In this example, the first formatting sub-module is capable of handling more output formats than the other sub-modules.

In some embodiments, data output may include control signals. For example, in a graphics processing system, pixels are output along with synchronization signals (e.g. hsync, vsync) and display enable signal. In this embodiment some pins or transfer blocks may be configured to output these multiple control signals. Control signals may be output through dedicated transfer blocks which transfer only the control signals. In other embodiments control signals may be embedded in a formatted data stream and are processed by a positioning module and the transfer blocks.

Figure 12A:
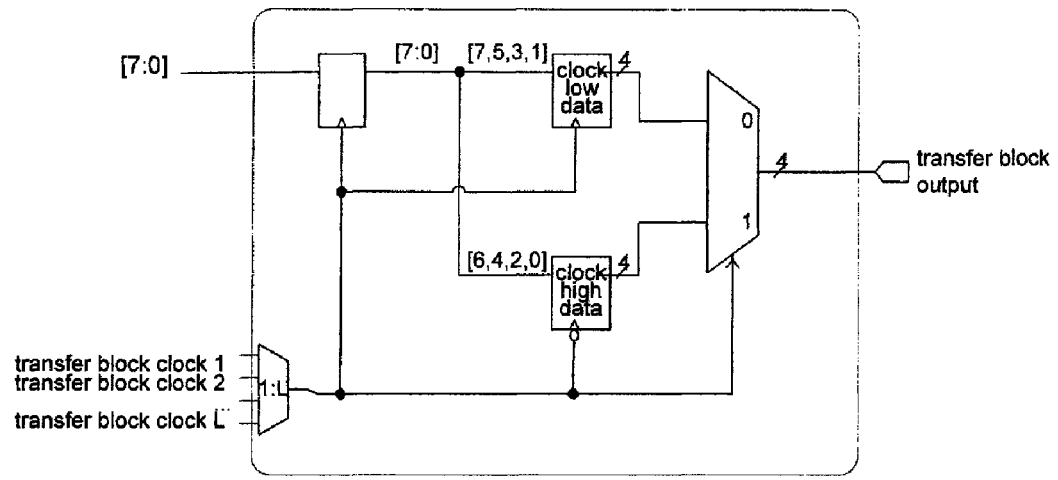
FIGS. 12A-12B are block diagrams of a transfer block connected to a mapping module, in accordance with an embodiment of the present invention.

FIG. 12A illustrates an embodiment of a transfer block for outputting data to pins of an output port. According to this embodiment, eight bits of data are received and split along even and odd bits. The bits are then multiplexed to the four output pins connected to the transfer block. Further in this embodiment, a plurality of clocks 1, 2, . . . , L are received by the transfer blocks. Clock multiplexing is done internally to each transfer block as illustrated in FIG. 12A. L clocks may be received by a transfer block and a clock associated with the output stream is chosen. In this example four pins of the output port are connected to the transfer block and use the same clock to output data which provides minimal skew between the pins.

Figure 12B:
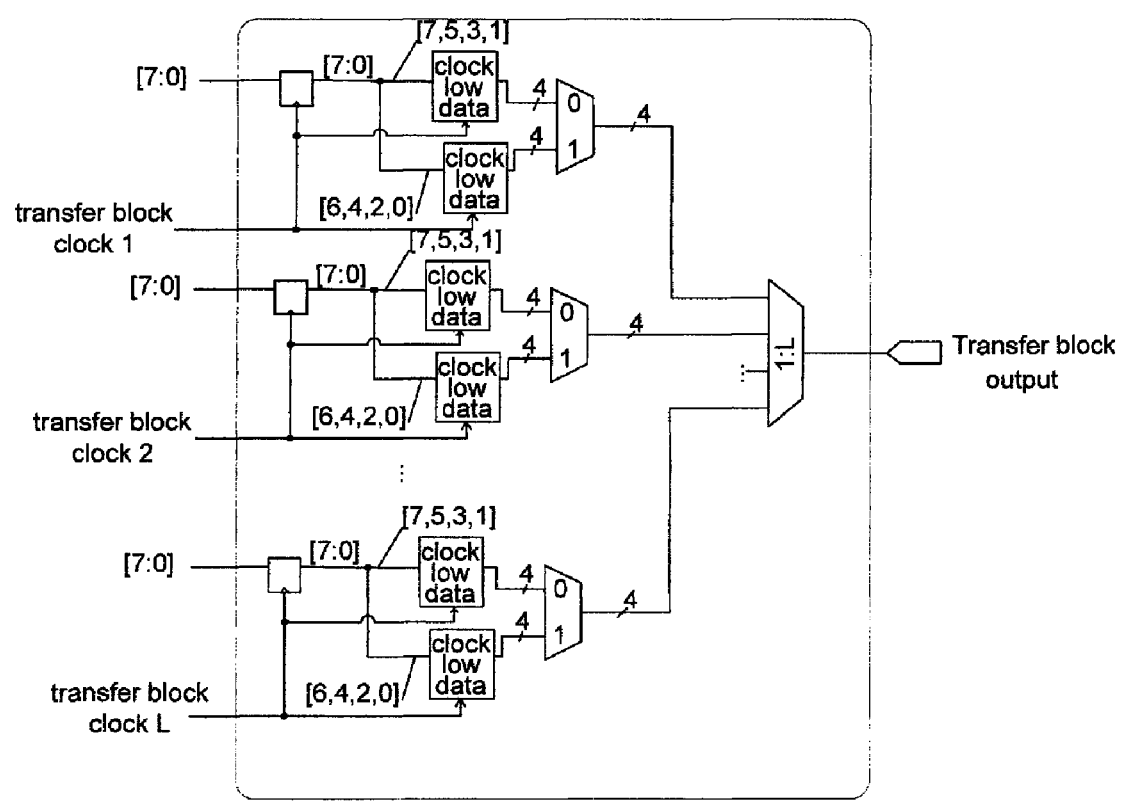

FIG. 12B illustrates another embodiment of a transfer block. In this embodiment a transfer block may receive L times the same vector of bits [7:0] from a mapping module where L is the number of clocks that a transfer block may receive. Each vector of bits is input, processed using a corresponding clock and sent to a multiplexer which chooses the vector to output at a desired clock rate.

In other embodiments, a mapping module may be implemented as a single process. In some embodiments, formatting and positioning of data streams is performed in one step. A data stream may be received by a mapping module and may be formatted and sent to an appropriate set of transfer blocks according to an output format, an output mode and an output rate. Further in one embodiment, positioning of the bits may be predefined. For example, bit 1 can be positioned to output pin 1, 24, or 64 only. This reduces the complexity of the required circuitry. In another embodiment, positioning is not predefined. Positioning can be done by transfer block or by bit, i.e. a positioning module may either send each bit received independently to a transfer block, or it may send sets of bits to a transfer block. This choice will also affect the complexity level of the circuit.

In some embodiments, a mapping and transfer module 58 may be configured by a user who specifies through a software application the number of streams to output and their respective formats, rates and output modes. The user may also specify the formatting method to be used. Alternatively, mapping and transfer module 58 may be configured on-the-fly by reading parameters from the data when the input streams of data are received. In other embodiments, the mapping module may receive control signals provided by external sources, such as for example an external processor, which sets up the mapping and transfer module to output streams according to desired output formats, output rates and output modes.

Similar systems and methods may be used to configure a digital input port to receive a plurality of input streams of variable length using variable input rates.

Figure 13:
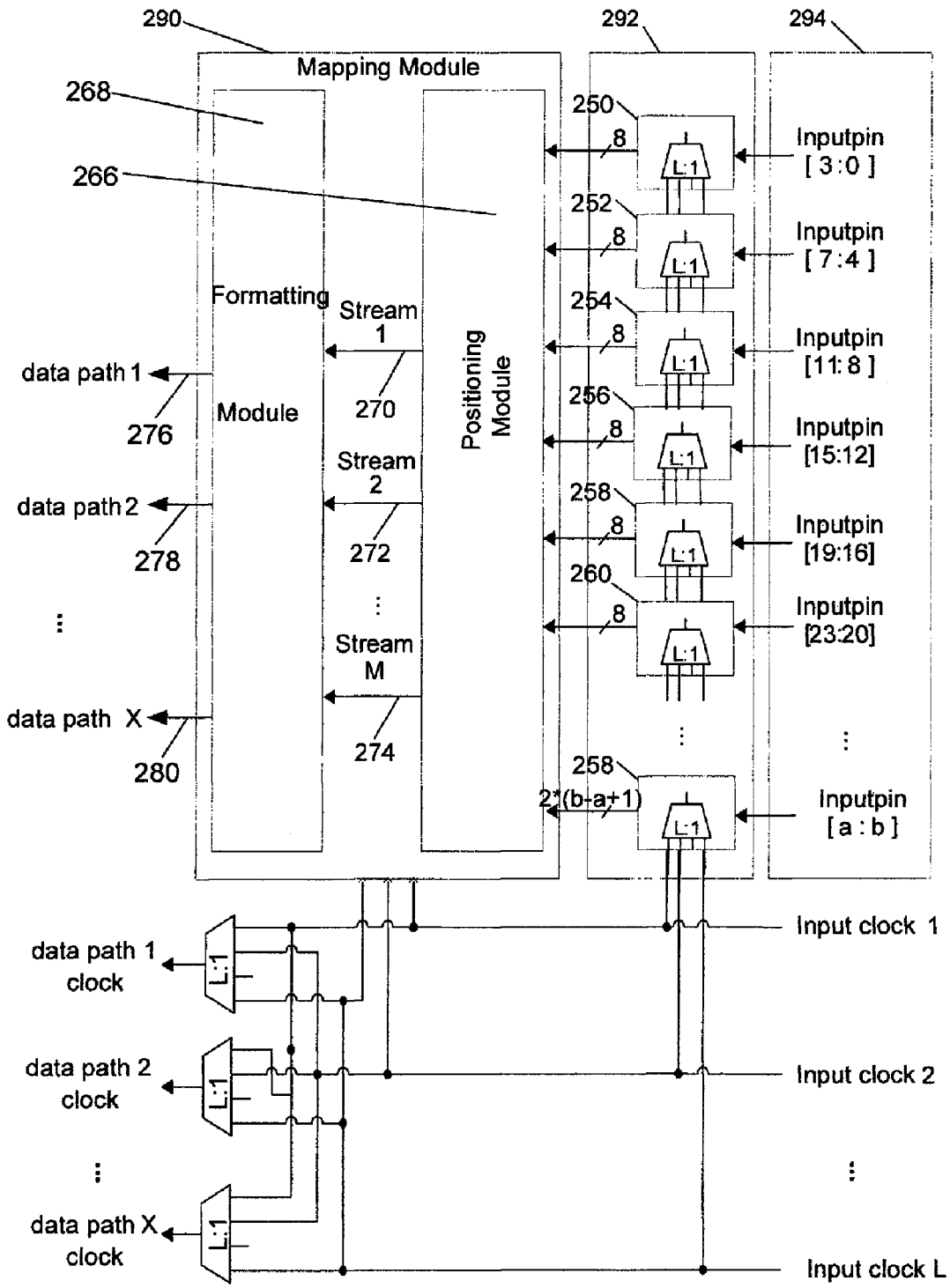
FIG. 13 illustrates a block diagram of a programmable input system in accordance with an embodiment of the present invention.

In one embodiment, mapping and transfer module 104 illustrated in FIG. 2 can be divided in sub-modules. FIG. 13 illustrates an example of a mapping and transfer module. FIG. 13 illustrates a system including a mapping module 290, a set of transfer blocks 292 and a digital input port 294. In this embodiment, mapping module 290 is divided in a formatting module 268 and a positioning module 266 as illustrated in FIG. 13. A digital input port 294 comprises a plurality of input pins each one connected to a transfer block. The input pins are grouped together by transfer blocks. In this embodiment, each transfer block 250, 252, 254, 256, 258, 260 and 262 (which are a subset of the set of transfer blocks 292) is connected to four input pins. Transfer block 250 is connected to input pins 0 to 3, transfer block 252 is connected to input pins 4 to 7, . . . and transfer block 262 is connected to input pins b to a. Again, the number of input pins connected to each transfer block, the number of transfer blocks and the number of input pins may vary.

In one embodiment, the positioning module 266 and the formatting module 268 are configured to receive a plurality of input streams from the set of transfer blocks 292. The input data is received through input pins connected to the transfer blocks and is sent to the mapping module 290, where the input streams are reconstructed as a function of an input format, an input rate, an input mode and additional input parameters. For example, positioning module 266 receives a vector containing data coming from different input data streams and separates the vector into a plurality of data streams (or vectors) according to the input format, rate and mode at which data was input. These vectors are then sent to formatting module 268 in the form of a set of streams, for example streams 270, 272, and 274. Formatting module 268 receives streams from the positioning module, formats each stream and assigns at least one data path from the set of data paths (e.g. data path 276, 278, and 280) to each stream as a function of the input format, the input mode and the input rate for further processing or for storing in a memory.

In some embodiments, the formatting module 268 may include a plurality of formatting sub-modules, such that each sub-module receives a data stream from the positioning module, formats it and sends it to one or more data paths. In one embodiment, the formatting module 268 may include 4 formatting sub-modules and may receive four streams from the positioning module. In this embodiment, the positioning module and the formatting sub-modules may be configured to receive up to 4 different streams from the digital input port such that each stream may be input using a different input rate, input mode and a different input format.

The digital input port 294 receives the streams and sends them to the appropriate transfer blocks. Data is sent from the set of transfer blocks 292 to the positioning module 266. Positioning module 266 divides the vector received from the transfer blocks into a plurality of streams according to an input format, an input mode and an input rate. As an example, tables equivalent to tables 10A and 10B may be used to determine according to the format, the mode, the rate of the data input and according to the blocks from which data has been received, how the stream of data should be reconstructed and sent to formatting module.

Each formatting sub-module included in formatting module 268 receives a stream and according to an input format, an input rate and an input mode may format the stream into one or more streams to be sent to appropriate data paths. For example, in a graphics system as illustrated in FIG. 2, two streams of 24 bits may be input through the same 24 pins of the digital input port using one input clock (i.e. data is input using a dual stream mode, double data rate and 24 bits format), a formatting sub-module receives a stream of data including bits of pixels as shown in FIG. 9 (24 bits, HHDDR, Dual stream clock1 and clock 2) and formats the data to reconstruct each stream s1 and s2 separately and sends each stream s1 and s2 to an appropriate data path.

It should be understood that the number of sub-modules, the number of transfer blocks, the number of input pins per transfer blocks, and the number of data streams may vary.

Further, in some embodiments, the mapping module may be implemented as a single process and may receive an input vector from the plurality of transfer blocks and map separate streams to data paths.

A person skilled in the art will understand that tables mirroring those illustrated for positioning and formatting output data may be used to implement the positioning and formatting modules connected to a digital input port. It should also be understood that the input format, the input rate, the input mode and additional input parameters can correspond to the output format, the output rate, the output mode and the additional output parameters.

Figure 14:
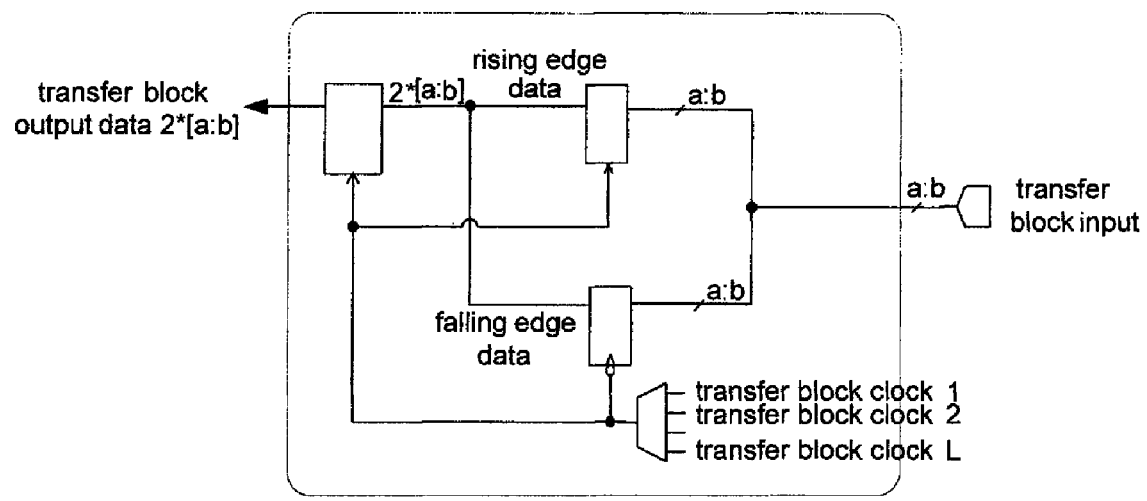
FIG. 14 is a block diagram of transfer block connected to a mapping module, in accordance with an embodiment of the present invention.

FIG. 14 illustrates an embodiment of a transfer block from FIG. 13. The bits are processed in a manner similar to that illustrated in FIG. 12A. Again, it should be understood that the input transfer block is a mirror image of the output transfer block illustrated in FIG. 12A. In the example, illustrated in FIG. 14, the transfer block is configured to receive data from (a−b+1) input pins. According to an input rate, data is either retrieved at one edge of the clock or at both edges of the clock. Then a vector of 2*(a−b+1) bits is transmitted to a mapping module using a multiplexed clock (from the set of clocks 1, 2, . . . , L). As was the case for FIG. 12A, alternative embodiments for implementing the transfer block are possible.

The methods and systems described herein allow X number of pins of a digital port to be allocated as desired. Having the pins regrouped per block allows different data streams to be transferred on the pins using different clocks, with the possibility of having the clocks be asynchronous. The method and system are programmable such that the number of data streams transferred on the pins may vary according to transfer formats, transfer rates and transfer modes. Data streams may be transferred using the pins and may be either input to a system or output from it. A transfer block controls data output or input through a number of pins selected with a balance of complexity verses flexibility. The more pins in a block, the lower the complexity of the circuit, but the lower the flexibility for pin allocation. As described previously, the set of pins connected to a transfer block is controlled by one clock. In a system including a set of transfer blocks, when the configuration is changed (i.e. at least one of the rates, formats, modes or number of streams is changed), a clock is selected from a set of possible clocks for each transfer block. All the pins connected to a transfer block are balanced to output or input data according to the selected clock which reduces the skew between the different pins. Transfer blocks may be physical copies of each other, and may have the same delays when they receive a determined clock and data to transfer. This may be very useful and very efficient in systems that need to output or input data at high frequencies. Further, each clock used to output or input data is balanced outside the transfer blocks therefore instead of balancing X number of pins, only the number of blocks is balanced.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system.

It should be noted that the present invention can be carried out as a method, can be embodied in a system, a computer readable medium or an electrical or electro-magnetic signal. The embodiments of the invention described above are intended to be exemplary only. The scope of the invention is therefore intended to be limited solely by the scope of the appended claims.

We claim:

1. A method for receiving a plurality of data streams into at least one data path via an input port, the method comprising:
   receiving a set of input parameters, the input parameters comprising an input rate, an input format and additional parameters;
   allocating input pins of the input port for the data streams by selecting, for each of said data streams, at least one transfer block from a plurality of transfer blocks as a function of the input parameters, each of said transfer blocks being connected to a plurality of the input pins of the input port and independently controlled by a given clock, whereby an allocation of the input pins for a first set of the input parameters may differ from an allocation of the input pins for a second set of the input parameters;
   receiving each of the data streams from the input pins as allocated via the at least one transfer block selected, using a corresponding clock rate; and
   sending each of the data streams received, from the at least one transfer block selected to the at least one data path.

2. A method as claimed in claim 1, wherein said receiving each of the data streams comprises using asynchronous clocks for at least two of said transfer blocks.

3. A method as claimed in claim 1, wherein said receiving each of the data streams comprises receiving two data streams on a same input pin, one of said two data streams being input on a rising edge of said given clock and another of said two data streams being input on a falling edge of said given clock.

4. A method as claimed in claim 1, wherein said allocating input pins comprising a first phase of positioning bits of said data streams and a second phase of formatting said data streams to be transferred to said at least one data path.

5. A system for receiving a plurality of data streams via an input port, the system comprising:
   a plurality of transfer blocks, each of said transfer blocks being connected to a plurality of input pins of the input port and independently controlled by a given clock; and
   a mapping module adapted to:
      receive a set of input parameters, the input parameters comprising an input rate, an input format and additional parameters;
      allocate input pins of the input port for the data streams by selecting, for each of the data streams, at least one transfer block from the plurality of transfer blocks as a function of the input parameters, whereby an allocation of the input pins for a first set of the input parameters may differ from an allocation of the input pins for a second set of the input parameters;
      receive each of the data streams from the input pins as allocated via the at least one transfer block selected, using a corresponding clock rate; and
      send each of the data streams received, from the at least one transfer block selected to at least one data path.

6. A system as claimed in claim 5, wherein said mapping module comprises a formatting unit for formatting said data streams and a positioning module for positioning bits of said data streams to said input pins.

7. A system as claimed in claim 5, wherein a clock for a first of said transfer blocks and a clock for a second of said transfer blocks are asynchronous.

8. A system as claimed in claim 5, wherein said transfer blocks are adapted to receive two data streams on at least one same input pin, one of said two data streams being input on a rising edge of said given clock and another of said two data streams being input on a falling edge of said given clock.

9. A configurable apparatus for inputting at least two data streams, the apparatus comprising:
   an input port comprising a plurality of input pins;
   a plurality of transfer blocks, each transfer block connected to a subset of pins from the plurality of input pins; and
   a mapping module adapted to:
      receive a set of input parameters, the input parameters comprising an input rate, an input format and additional parameters;
      allocate input pins of the input port for said at least two data streams by selecting, for each of the at least two data streams, at least one transfer block from the plurality of transfer blocks as a function of the input parameters, whereby an allocation of the input pins for a first set of the input parameters may differ from an allocation of the input pins for a second set of the input parameters;
      receive each of said at least two data streams from the input pins as allocated via the at least one transfer block selected; and
      send each of the at least two data streams received, from the at least one transfer block selected to at least one data path.

10. A method for receiving a plurality of data streams via an input port comprising a plurality of input pins, the method comprising:
   receiving a set of input parameters, the input parameters comprising an input rate, an input format and additional parameters;

allocating input pins of the input port for the data streams by selecting, for each of said data streams, at least one input pin from the plurality of input pins as a function of the input parameters, whereby an allocation of the input pins for a first set of the input parameters may differ from an allocation of the input pins for a second set of the input parameters;

receiving the data streams into the input pins as allocated, at least one of the input pins allocated receiving two independent data streams, one of the two independent data streams being received on a rising edge of a clock and another of the two independent data streams being received on a falling edge of the clock; and sending each of the data streams received to at least one data path.

11. A method as claimed in claim 10, wherein said allocating input pins comprises a first phase of separating said two independent data streams and a second phase of reconstructing each one of said two independent data streams according to said input parameters.

* * * * *